(12) United States Patent
Sim et al.

(10) Patent No.: US 8,996,818 B2
(45) Date of Patent: Mar. 31, 2015

(54) BYPASSING MEMORY REQUESTS TO A MAIN MEMORY

(71) Applicant: Advanced Micro Devices, Sunnyvale, CA (US)

(72) Inventors: Jaewoong Sim, Atlanta, GA (US); Gabriel H. Loh, Bellevue, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 187 days.

(21) Appl. No.: 13/709,044

(22) Filed: Dec. 9, 2012

(65) Prior Publication Data

US 2014/0164713 A1   Jun. 12, 2014

(51) Int. Cl.
*G06F 12/00* (2006.01)
*G06F 12/08* (2006.01)

(52) U.S. Cl.
CPC .................................. *G06F 12/0888* (2013.01)
USPC .......................................................... 711/138

(58) Field of Classification Search
None
See application file for complete search history.

(56) References Cited

U.S. PATENT DOCUMENTS

| 6,356,980 | B1 * | 3/2002 | Arimilli et al. | 711/138 |
| 6,959,363 | B2 * | 10/2005 | Southwell et al. | 711/137 |
| 2010/0274962 | A1 * | 10/2010 | Mosek et al. | 711/113 |
| 2011/0047437 | A1 * | 2/2011 | Flynn | 714/758 |
| 2012/0124294 | A1 * | 5/2012 | Atkisson et al. | 711/135 |

* cited by examiner

*Primary Examiner* — Brian Peugh
(74) *Attorney, Agent, or Firm* — Park, Vaughan, Fleming & Dowler, LLP (57) ABSTRACT

Some embodiments include a computing device with a control circuit that handles memory requests. The control circuit checks one or more conditions to determine when a memory request should be bypassed to a main memory instead of sending the memory request to a cache memory. When the memory request should be bypassed to a main memory, the control circuit sends the memory request to the main memory. Otherwise, the control circuit sends the memory request to the cache memory.

21 Claims, 6 Drawing Sheets

BYPASSING MEMORY REQUESTS TO A MAIN MEMORY

BACKGROUND

1. Field

The described embodiments relate to operating computing devices. More specifically, the described embodiments relate to a technique for conditionally bypassing memory requests to a main memory instead of sending the memory requests to a cache for resolution.

2. Related Art

Many modern computing devices (e.g., laptop/desktop computers, smart phones, set-top boxes, appliances, etc.) include a processing subsystem with one or more caches. Caches are generally smaller, fast-access memory circuits located in or near the processing subsystem that can be used to store data that is retrieved from lower levels of a memory hierarchy in the computing device (i.e., other, larger caches and/or memories) to enable faster access to the stored data.

During operation of such computing devices, memory requests are sent to a cache in an attempt to quickly resolve the memory requests. When attempts to resolve memory requests in the cache fail, the memory requests are forwarded to lower levels of the memory hierarchy to be resolved. In some cases, attempting memory requests in the cache in this way can result in unnecessary delay in the resolution of memory requests and/or can inefficiently use system resources in the computing device.

SUMMARY

Some embodiments include a computing device with a control circuit that handles memory requests. The control circuit checks one or more conditions to determine when a memory request should be bypassed to a main memory instead of sending the memory request to a cache memory. When the memory request should be bypassed to a main memory, the control circuit sends the memory request to the main memory. Otherwise, the control circuit sends the memory request to the cache memory.

In some embodiments, the memory request should be bypassed to the main memory instead of sending the memory request to the cache memory when the cache memory is to be busy.

In some embodiments, the cache memory is to be busy when one or more mechanisms for communicating with the cache memory will not be available for use within a predetermined time.

In some embodiments, when the memory request is part of a sequence of memory requests that comprises one or more other memory requests and the memory request, the cache memory is to be busy when a predetermined number of the other memory requests can be completed from an input-output buffer in the cache memory without refreshing the input-output buffer in the cache memory and so the predetermined number of the other memory requests are to be sent to the cache memory before the memory request.

In some embodiments, the predetermined number of the other memory requests that are to be sent to the cache memory before the memory request comprise at least one of: (1) one or more memory requests that occurred before the memory request or (2) one or more memory requests that occurred after the memory request.

In some embodiments, when the memory request is part of a sequence of memory requests that comprises one or more other memory requests and the memory request, the memory request should be bypassed to the main memory instead of sending the memory request to a cache memory when a portion of the memory requests from the sequence of memory requests that includes the memory request cannot be completed from an input-output buffer in the cache memory without refreshing the input-output buffer in the cache memory, but can be completed from an input-output buffer in the main memory without refreshing the input-output buffer in the main memory, and so the portion of the sequence of memory requests is to be sent to the main memory.

In some embodiments, when the memory request is part of a sequence of memory requests that comprises one or more other memory requests and the memory request, the memory request should be bypassed to the main memory instead of sending the memory request to the cache memory when a predetermined number of the other memory requests are to be sent to the cache memory. In some of these embodiments, the predetermined number is set based on a rate of completion of memory requests by the cache memory and a rate of completion of memory requests by the main memory.

In some embodiments, when the memory request is part of a sequence of memory requests that comprises one or more other memory requests and the memory request, the memory request should be bypassed to the main memory instead of sending the memory request to the cache memory when a predetermined number of the memory requests from the sequence of memory requests matches a predetermined pattern. In some of these embodiments, the predetermined pattern is a stream of sequential memory requests.

In some embodiments, the memory request should be bypassed to the main memory instead of sending the memory request to the cache memory when the memory request was generated by a lower-priority source.

In some embodiments, the control circuit is a memory controller located on a processor semiconductor die; the cache memory is located on one or more DRAM cache memory semiconductor dies that are stacked with (e.g., wholly or partially on, beside, near, etc.) the processor semiconductor die in a first package, the DRAM cache memory dies being communicatively coupled to the processor semiconductor die and serving as a cache for a processor on the processor semiconductor die; and the main memory is located on one or more DRAM memory semiconductor dies in a second package that is coupled to the first package

BRIEF DESCRIPTION OF THE FIGURES

Throughout the figures and the description, like reference numerals refer to the same figure elements.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

In some embodiments, a computing device (e.g., computing device 210 in FIG. 2) uses code and/or data stored on a computer-readable storage medium to perform some or all of the operations herein described. More specifically, the computing device reads the code and/or data from the computer-readable storage medium and executes the code and/or use the data when performing the described operations.

A computer-readable storage medium may be any device or medium or combination thereof that stores code and/or data for use by a computing device. For example, the computer-readable storage medium may include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs). In the described embodiments, the computer-readable storage medium does not include non-statutory computer-readable storage mediums such as transitory signals.

In some embodiments, one or more hardware modules are configured to perform the operations herein described. For example, the hardware modules may comprise, but are not limited to, one or more processors/processor cores, application-specific integrated circuit (ASIC) chips, field-programmable gate arrays (FPGAs), caches/cache controllers, embedded processors, graphics processors/cores, pipelines, and/or other programmable-logic devices. When such hardware modules are activated, the hardware modules may perform some or all of the operations. In some embodiments, the hardware modules include one or more general-purpose circuits that are configured by executing instructions (program code, firmware, etc.) to perform the operations.

In the following description, functional blocks may be referred to in describing some embodiments. Generally, functional blocks include one or more circuits (and, typically, multiple interrelated circuits) that performs the described operations. In some embodiments, the circuits in a functional block include complex circuits that execute program code (e.g., machine code, firmware, etc.) to perform the described operations.

Overview

The described embodiments include a computing device with a memory controller. The memory controller determines, based on one or more conditions, if memory requests should be bypassed from a processor in the computing device to a main memory instead of first attempting to satisfy the memory requests by sending the memory requests from the processor to an external cache memory (or "cache"). These embodiments take advantage of the fact that accessing the main memory to satisfy memory requests, in certain cases, may be as fast or faster than accessing the cache to satisfy the memory requests, or may more efficiently use main system bandwidth. The following description identifies various conditions in response to which memory requests are bypassed to a main memory instead of first attempting to satisfy the memory requests in the cache.

Computing Device

Figure 1:
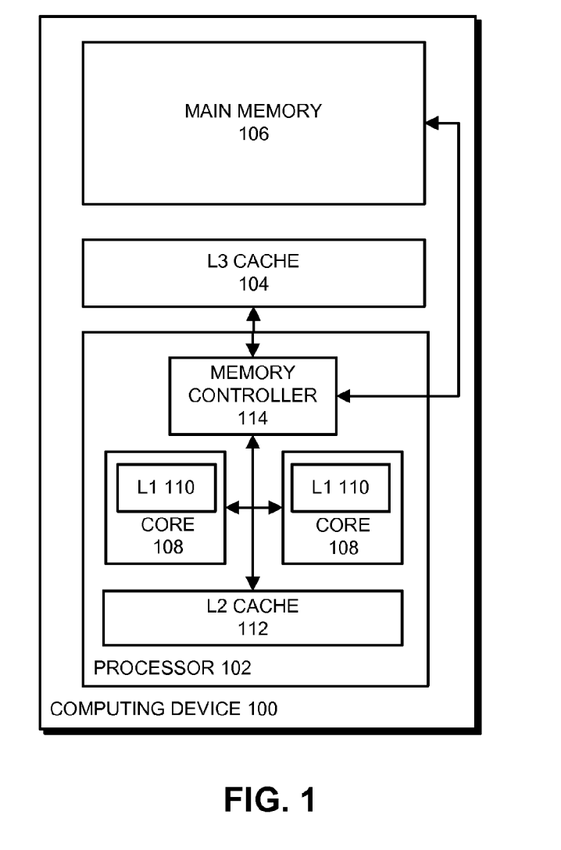
FIG. 1 presents a block diagram illustrating a computing device in accordance with some embodiments.

FIG. 1 presents a block diagram illustrating a computing device 100 in accordance with some embodiments. As can be seen in FIG. 1, computing device 100 includes processor 102, L3 cache 104, and main memory 106. Processor 102 is generally a device that performs computational operations in computing device 100. Processor 102 includes two processor cores 108, each of which includes a computational mechanism such as a central processing unit (CPU), a graphics processing unit (GPU), and/or an embedded processor.

Processor 102 also includes cache memories (or "caches") that are used for storing instructions and data that are used by the processor cores 108 for performing computational operations. As can be seen in FIG. 1, the caches in processor 102 include a level-one (L1) cache 110 ("L1 110") in each processor core 108 that is used for storing instructions and data for use by the processor core 108. Generally, the L1 caches 110 are the smallest of a set of caches in computing device 100 (e.g., 96 kilobytes (KB) in size) and are located closest to the circuits (e.g., execution units, instruction fetch units, etc.) in the processor cores 108 that use the instructions and data that are stored in the L1 caches 110. The closeness of the L1 cache 110 to the circuits enables the fastest access to the instructions and data stored in L1 cache 110 from among the caches in computing device 100.

Processor 102 also includes a level-two (L2) cache 112 that is shared by two processor cores 108 and hence is used for storing instructions and data for both of the sharing processor cores 108. Generally, L2 cache 112 is larger than the L1 caches 110 (e.g., 2048 KB in size) and is located outside, but close to, processor cores 108 on the same semiconductor die as the processor cores 108. Because L2 cache 112 is located outside the processor cores 108 but on the same die, access to the instructions and data stored in L2 cache 112 is slower than accesses to L1 cache 110, but faster than accesses to L3 cache 104 in computing device 100.

Returning to computing device 100, the largest of the caches in computing device 100 (at e.g., 16 MB in size), level-three (L3) cache 104 is shared by the processor cores 108 in processor 102 and hence is used for storing instructions and data for both of the processor cores 108. As can be seen in FIG. 1, L3 cache 104 is located external to processor 102 (e.g., on a different die or dies than processor 102), accordingly, accessing data and instructions in L3 cache 104 is typically slower than accessing data and instructions in the higher-level caches.

In some embodiments, L1 cache 110, L2 cache 112, and L3 cache 104 are fabricated from memory circuits such as one or more of embedded dynamic random access memory (eDRAM), static random access memory (SRAM), dynamic random access memory (DRAM), double data rate synchronous DRAM (DDR SDRAM), and/or other types of memory circuits. In some embodiments, at least L3 cache 104 is implemented as a stacked DRAM cache (stacked DRAM caches are described below in the description of FIG. 2).

Main memory 106 comprises memory circuits that form a "main memory" of computing device 100. Main memory 106 is used for storing instructions and data for use by the processor cores 108 on processor 102. In some embodiments, main memory 106 is fabricated from memory circuits such as one or more of dynamic random access memory (DRAM), double data rate synchronous DRAM (DDR SDRAM), and/or other types of memory circuits.

Taken together, L1 cache 110, L2 cache 112, L3 cache 104, and main memory 106 form a "memory hierarchy" in and for computing device 100. Each of the caches and main memory 106 are regarded as levels of the memory hierarchy, with the lower levels including the larger caches and main memory 106. Within computing device 100, memory requests are preferentially handled in the level of the memory hierarchy that results in the fastest and/or most efficient operation of computing device 100. For example, as described herein, memory requests are conditionally bypassed to main memory 106 instead of being sent to L3 cache 104 to enable faster and/or more efficient handling of the memory requests.

Memory controller 114 is a functional block that controls access to L3 cache 104 and main memory 106 for memory requests generated in processor 102. Generally, in these embodiments, when data (which may include data and/or instructions) is to be accessed by processor 102, a processor core 108 or another source in processor 102 sends a memory request to memory controller 114 requesting access to the data. Memory controller 114 then sends the memory request to L3 cache 104 or main memory 106 for satisfaction/resolution of the memory request. In these embodiments, satisfaction/resolution of a memory request includes operations such as retrieving the requested data from L3 cache 104 or main memory 106, writing data to L3 cache 104 or main memory 106, etc.

In the described embodiments, before sending a memory request to L3 cache 104 or main memory 106, memory controller 114 determines, based on one or more conditions, if the memory request should be bypassed to main memory 106 instead of first attempting to satisfy the memory request by sending the memory request to L3 cache 104. When at least one of the one or more conditions is met, memory controller 114 bypasses the memory request to main memory 106. Otherwise, memory controller 114 sends the memory request to the L3 cache 104 so that L3 cache 104 can attempt to satisfy the memory request with cached data. Some conditions used by memory controller 114 for making this determination are described in the examples below.

In some embodiments, communication paths (that include one or more busses, wires, and/or electrical connections) are coupled between the various elements in computing device 100 (core 108, memory controller 114, main memory 106, etc.), as shown by arrow-headed lines between the elements. The communication paths are used to transmit commands such as memory requests, data such as return data for memory requests, and/or other information between the elements.

Although embodiments are described with a particular arrangement of processor cores, some embodiments include a different number and/or arrangement of processor cores. For example, some embodiments have only one processor core (in which case the caches are used by the single processor core), while other embodiments have two, six, eight, or another number of processor cores—with the cache hierarchy adjusted accordingly. Generally, the described embodiments can use any arrangement of processor cores that can perform the operations herein described.

Additionally, although embodiments are described with a particular arrangement of caches, some embodiments include a different number and/or arrangement of caches. For example, the caches (e.g., L1 cache 110, etc.) may be divided into separate instruction and data caches. Additionally, L2 cache 112 may not be shared, and hence may only be used by a single processor core (and hence there may be two L2 caches 112 in processor 102). As another example, some embodiments include different levels of caches, from only one level of cache to multiple levels of caches, and these caches may be located in processor 102 and/or external to processor 102. Generally, the described embodiments can use any arrangement of caches that can perform the operations herein described.

Moreover, although computing device 100 and processor 102 are simplified for illustrative purposes, in some embodiments, computing device 100 and/or processor 102 include additional mechanisms for performing the operations herein described and other operations. For example, computing device 100 and/or processor 102 may include power controllers, mass-storage devices such as disk drives or large semiconductor memories (as part of the memory hierarchy), batteries, media processors, input-output mechanisms, communication mechanisms, networking mechanisms, display mechanisms, etc.

Processor Die with External Cache Implemented Using Stacked Dynamic Random Access Memory (DRAM)

Figure 2:
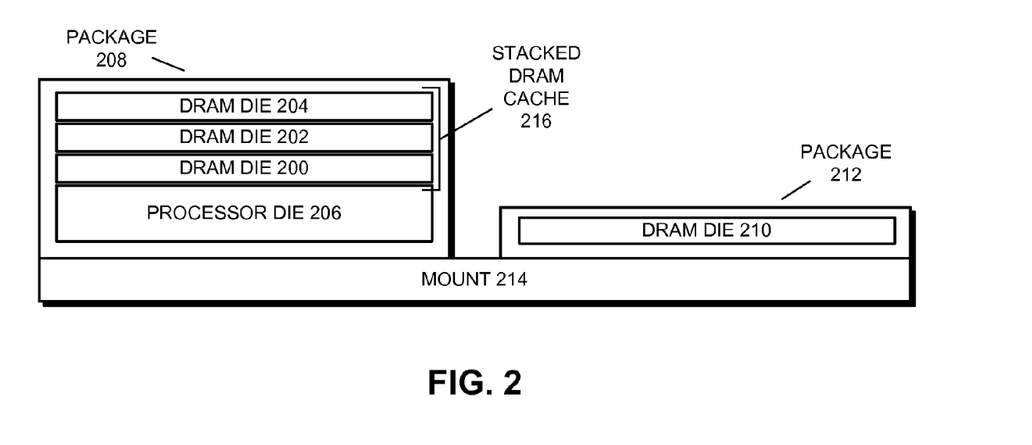
FIG. 2 presents a block diagram illustrating a processor die with a stacked DRAM cache in accordance with some embodiments.

In some embodiments, an external cache for processor 102 is implemented as a stacked DRAM cache. For example, in computing device 100, the external L3 cache 104 may be implemented as a stacked DRAM cache. FIG. 2 presents a block diagram illustrating a processor die with a stacked DRAM cache 216 in accordance with some embodiments. As can be seen in FIG. 2, stacked DRAM cache 216 is implemented using multiple DRAM dies 200-204 that are stacked on top of processor die 206 in a package 208. In these embodiments, processor die 206 includes one or more processors (which may include internal elements similar to processor 102).

DRAM dies 200-204 include DRAM memory circuits that are used as an external cache for the processor(s) on processor die 206 (interchangeably called a "DRAM cache"). For example, and as described above, in some embodiments, the DRAM memory circuits on DRAM dies 200-204 are collectively used to implement L3 cache 104, with each DRAM die including a portion of the memory circuits for L3 cache 104. DRAM dies 200-204 are communicatively coupled to each other and processor die 206 using through-substrate vias, proximity communication, metal pads, and/or other techniques.

FIG. 2 additionally includes package 212 with DRAM die 210. DRAM die 210 includes DRAM memory circuits that are used as main memory 106 in computing device 100 (interchangeably called "DRAM memory"). DRAM die 210 is communicatively coupled via package 212 to one or more of processor die 206 and DRAM dies 200-204 in package 208 e.g., using metal routes or wire traces on mount 214, which may be a substrate, a circuit board, etc. For example, packages 208 and 212 may include a number of conductive or non-conductive connectors such as pins, solder bumps, and/or capacitively-coupled connectors through which the various dies are communicatively coupled to the die(s) in the other package.

In some embodiments, access times to stacked DRAM cache 216 are faster than access times to DRAM memory, but the access times are sufficiently close to enable timely satisfying certain memory requests by bypassing the memory requests to the DRAM memory, instead of first attempting to satisfy the memory requests by sending the memory requests to the DRAM cache. For example, in some embodiments and under average operating conditions, the access times to the DRAM memory are 2-4 times longer than the access times to the DRAM cache.

In some embodiments, when satisfying memory requests by reading data from the DRAM memory circuits in some or all of DRAM dies 200-204 and 210, a determination is made if a block of memory in the DRAM memory circuit, called a row, that contains the requested data (or instruction), and the data for the memory request is read out of the row to be returned in response to the memory request. In some embodiments, read operations do not operate directly on data in the DRAM memory circuits, instead, once read from the row, the row's data is placed into a row buffer for the corresponding DRAM memory circuit. The row buffer is then accessed/read to acquire the data for satisfying memory requests.

In some embodiments, each DRAM memory circuit (and thus the level of the memory hierarchy comprising the DRAM memory circuit) includes a single row buffer, which means that all reads to the DRAM memory circuit are handled using the same row buffer. In these embodiments, memory reads in the DRAM memory circuit are handled sequentially, with each memory read awaiting the resolution of prior memory reads (and perhaps one or more subsequent memory reads that may read from the same row buffer when taken out of order, as described below) before being handled. In some embodiments, some or all of the DRAM memory circuits is internally divided, e.g., into a number of banks, that each comprises a row buffer, which means that reads from different parts (e.g., banks) of the DRAM memory circuits may be handled simultaneously, although reads from within a given bank are handled sequentially.

In some embodiments, memory requests are for chunks of memory small enough in size that the memory requests read data from only a portion of a row in the DRAM memory circuits. For example, in some embodiments, memory requests are for 64 bytes and rows in the DRAM memory circuits hold 1 KB of data. In such embodiments, several different memory requests can be satisfied from the same row buffer after the data is read from the DRAM memory circuit. For example, two or more memory requests to sequential or closely-spaced memory addresses may be able to be satisfied from a single row buffer. Additionally, in some embodiments, the row buffer in the DRAM cache (at e.g., 1 KB) is smaller than the row buffer in the DRAM memory (at e.g., 8 KB). Thus, in these embodiments, more individual memory requests can be satisfied from the same row buffer in the DRAM memory then in the DRAM cache.

In some embodiments, the DRAM memory circuits in some or all of DRAM dies 200-204 and 210 are managed using an open-page policy, under which the row buffer is allowed to be accessed/read any number of times after data is read from the DRAM memory circuits. In some embodiments, the DRAM memory circuits in some or all of DRAM dies 200-204 and 210 are managed using a closed-page policy, under which a row buffer is only allowed to be read a limited number of times (e.g., once) before the data is to be re-processed through the DRAM memory circuits (which may include, after a read/write of the row buffer, writing the data from the row buffer back to the DRAM memory circuits and then, if the same data is to be accessed again, re-reading the data back into the row buffer). In some embodiments, different open-page/closed-page policies are used in different levels of the memory hierarchy. For example, in some embodiments, the DRAM cache is managed using a closed-page policy and the DRAM memory is managed using an open-page policy. In such embodiments, performing multiple reads of data is more efficient in the DRAM memory than it is from the DRAM cache for certain memory access patterns.

Although shown in a particular stacked configuration in FIG. 2, in some embodiments, some or all of DRAM dies 200-204 are not stacked on top of processor die 206, instead, some or all of them are arranged beside, under, or otherwise proximate to/near processor die 206. In this description, the terminology "stacked with" a processor when referring to DRAM dies generally includes any arrangement (stacked on, beside, under, proximate to/near, etc.) of DRAM dies with respect to the processor. In some of these embodiments, DRAM dies 200-204 do not overlap a portion of processor die 206, and hence the communicative coupling between DRAM dies 200-204 and processor die 206 includes metal routes or wire traces in package 208 (or in a mount in package 208), and/or other communicative couplings. In addition, although shown in FIG. 2 as single dies, in some embodiments, some or all of DRAM dies 200-204 in stacked DRAM cache 216 and DRAM die 210 are implemented using two or more separate DRAM dies.

Memory Controller

Figure 3:
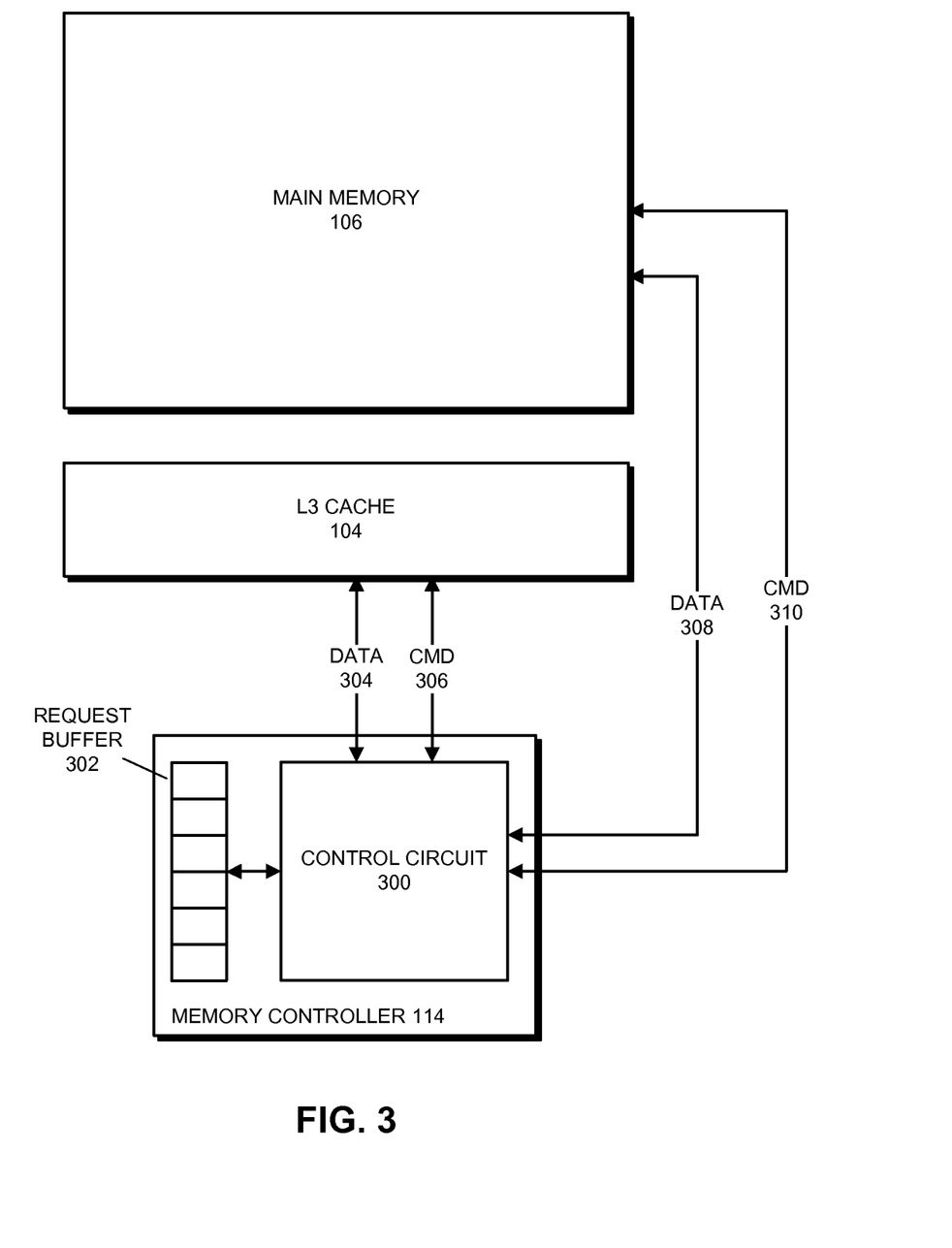
FIG. 3 presents a block diagram illustrating a memory controller in accordance with some embodiments.

FIG. 3 presents a block diagram illustrating memory controller 114 in accordance with some embodiments. As described above, when data (or instructions) are to be accessed by processor 102 (e.g., by one of the processor cores 108, L1 cache 110, L2 cache 112, and/or another source in processor 102), processor 102 sends a memory request to memory controller 114 requesting to access the data. Memory controller 114 then determines, based on one or more conditions, whether the memory request is to be sent to L3 cache 104 in an attempt to satisfy the memory request or, instead, is to be bypassed to main memory 106. (Note that the remainder of the elements in FIG. 1 are not shown in FIG. 3 for clarity.)

As can be seen in FIG. 3, memory controller 114 includes control circuit 300 and request buffer 302. Control circuit 300 includes one or more circuits (logic circuits, embedded processors, etc.) that perform at least some operations for handling memory requests in memory controller 114. For example, in some embodiments, control circuit 300 determines, based on one or more conditions, if memory requests should be bypassed to main memory 106 instead of first attempting to satisfy the memory requests by sending the memory requests to L3 cache 104.

A communication path that comprises example data 304 and command (CMD) 306 signal lines is coupled between memory controller 114 and L3 cache 104, and a communication path that comprises example data 308 and command 310 signal lines is coupled between memory controller 114 and main memory 106. In some embodiments, the corresponding signal lines are used to exchange commands and data between control circuit 300 and L3 cache 104 and main memory 106. Although various commands and data may be exchanged, one example command includes a memory request and example data includes data (where the general term "data" comprises data and/or instructions) returned in response to a memory request.

Request buffer 302 is a memory structure (e.g., a table, a list, a register file, etc.) with a number of entries, each of which may hold a buffered memory request to be sent from memory controller 114 to L3 cache 104 and/or main memory 106. In some embodiments, control circuit 300 monitors the buffered memory requests and determines whether one or more of the buffered memory requests are to be bypassed to main memory 106 instead of being sent to L3 cache 104 to be resolved. Although various conditions and cases that control circuit 300 uses to determine whether one or more of the buffered memory requests are to be bypassed to main memory 106 are described below, the conditions used to make the determination generally amount to a determination of whether one or more buffered memory requests will likely be resolved more quickly and/or more efficiently (in terms of system bandwidth utilization, power consumption, etc.) if bypassed to main memory 106 than if sent to L3 cache 104. Note that memory requests in request buffer 302 may be bypassed to main memory 106 as a group, as described below.

Although example communication paths are shown in FIG. 3, some embodiments include different numbers and/or types of communication paths. As an example, the communication paths between control circuit 300 and L3 cache 104 and/or main memory 106 may include different signal lines. As another example, control circuit 300, L3 cache 104, and main memory 106 may be coupled to a single bus for communicating. Generally, the described embodiments can use any arrangement of communication paths upon which memory requests can be selectively sent from control circuit 300 to either of L3 cache 104 and main memory 106.

High-Priority Sources and Low-Priority Sources

In some embodiments, memory controller 114 recognizes high-priority and low-priority sources of memory requests. In these embodiments, each memory request includes information identifying a source of the memory request, and control circuit 300 uses the information in the memory request to determine if the memory request is from a high-priority source or a low-priority source. For example, in some embodiments, memory controller 114 compares the information from the memory request to one or more listings of high-priority sources to determine if there is a match between the information from the memory request and a high-priority source.

Generally, a high-priority source of memory requests is a source for which responses to memory requests should be returned the most expediently. For example, in some embodiments, a CPU and a high-priority software application are two sources of memory requests that are considered high-priority sources. A low-priority source is a source that can tolerate some amount of extra latency in returning responses to memory requests. For example, in some embodiments, a GPU, a low-priority software application, and a hardware prefetcher in a processor core 108 (not shown) are three sources of memory requests that are considered low-priority sources.

Recall that control circuit 300 determines, based on one or more conditions, if memory requests should be bypassed from processor 102 to main memory 106 instead of first attempting to satisfy the memory requests by sending the memory requests from to L3 cache 104. In some embodiments, one of the conditions upon which the determination is made is the priority of the source of the memory request. For example, in some embodiments, control circuit 300 determines that memory requests from high-priority sources are to be sent to L3 cache 104, and that memory requests from low-priority sources are to be bypassed to main memory 106.

Processes for Conditionally Bypassing Memory Requests

Figure 4:
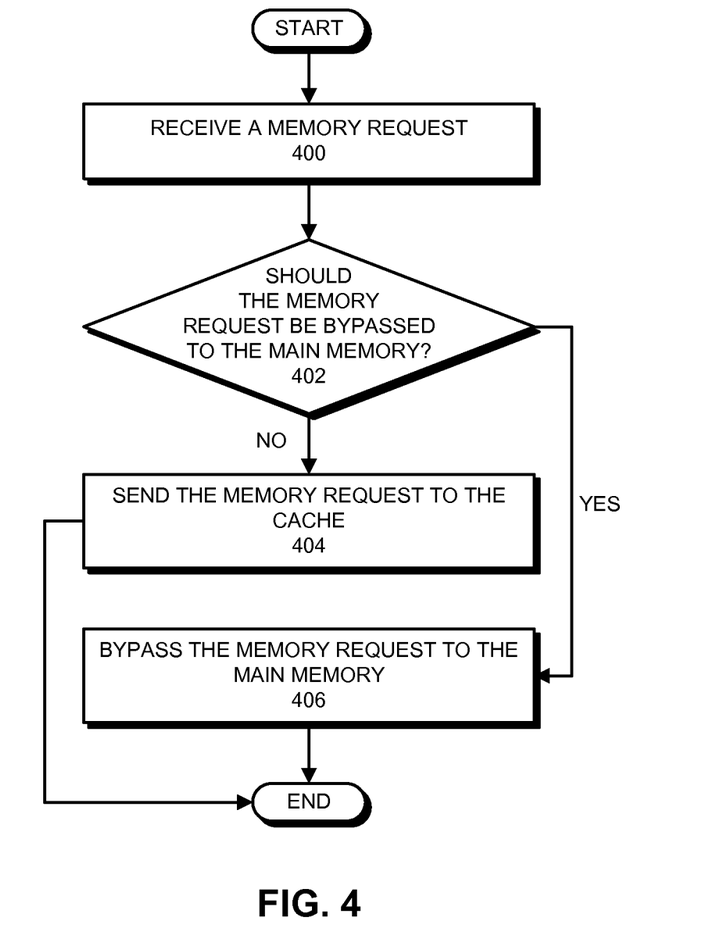
FIG. 4 presents a flowchart illustrating a process for conditionally bypassing memory requests in accordance with some embodiments.

FIG. 4 presents a flowchart illustrating a process for conditionally bypassing memory requests in accordance with some embodiments. Note that the operations shown in FIG. 4 are presented as a general example of functions performed by some embodiments. The operations performed by other embodiments include different operations and/or operations that are performed in a different order. Additionally, although certain mechanisms in computing device 100 are used in describing the process, in some embodiments, other mechanisms may perform the operations.

The process shown in FIG. 4 starts when control circuit 300 receives a memory request (step 400). For example, control circuit 300 may receive the memory request from a processor core 108, L1 cache 110, L2 cache 112, or another source in processor 102. In the described embodiments, the memory request can be, or can include, any type of memory request that can be resolved in either L3 cache 104 (when the requested data is present in L3 cache 104) or main memory 106, such as memory reads, memory writes, etc.

Control circuit 300 then determines if the memory request should be bypassed to a main memory instead of sending the memory request to a L3 cache 104 (step 402). In the examples below, various conditions are described that control circuit 300 may check when determining if the memory request should be sent to main memory 106 instead of sending the memory request to L3 cache 104. Although these conditions are described separately in the examples below, any number of the conditions could be checked when determining if the memory request should be sent to a main memory instead of sending the memory request to a L3 cache 104.

As described herein, the conditional bypassing of memory requests to main memory 106 includes sending memory requests immediately to main memory 106 without first attempting to resolve the bypassed memory requests in L3 cache 104. This conditional bypassing differs from the handling of memory requests in existing systems, in which memory requests are attempted in an external cache and then sent to main memory when the attempt to resolve the memory requests in the external cache fails (i.e., when there was a cache miss for the memory request). The described embodiments therefore handle memory requests more quickly and/or efficiently than existing systems.

When the memory request should be sent to L3 cache 104 (step 402), control circuit 300 sends the memory request to the L3 cache 104 (step 404). In some embodiments, sending the memory request to L3 cache 104 comprises sending a signal/packet/message (collectively, a "message") with information about the memory request to L3 cache 104 on command 306 signal line. Upon receiving the message, L3 cache 104 determines if a corresponding cache block is present in L3 cache 104, and if so, retrieves and returns the data in the corresponding cache block to control circuit 300 on the data 304 signal line. Control circuit 300 then forwards the retrieved data to the source of the memory request in processor 102. Otherwise, if the corresponding cache block is not present in L3 cache 104, L3 cache 104 sends a message to control circuit 300 indicating that the requested data is not present in L3 cache 104 (i.e., the memory request missed in L3 cache 104). Control circuit 300 then forwards the memory request to main memory 106. Next, main memory 106 then retrieves the data for resolving the memory request and returns the data on data 308 signal line to control circuit 300 to be forwarded to the source of the memory request in processor 102 (control circuit 300 may also return the data to L3 cache 104 to allow L3 cache 104 to determine if the returned data should be cached).

When the memory request should be bypassed to main memory 106, control circuit 300 bypasses the memory request to main memory 106 (step 406). In some embodiments, bypassing the memory request to main memory 106 comprises sending a signal/packet/message (collectively, a "message") with information about the memory request to main memory 106 on command 310 signal line. Upon receiving the message, main memory 106 retrieves and returns the requested data to control circuit 300 on the data 308 signal line. Control circuit 300 then forwards the retrieved data to the source of the memory request in processor 102.

Figure 5:
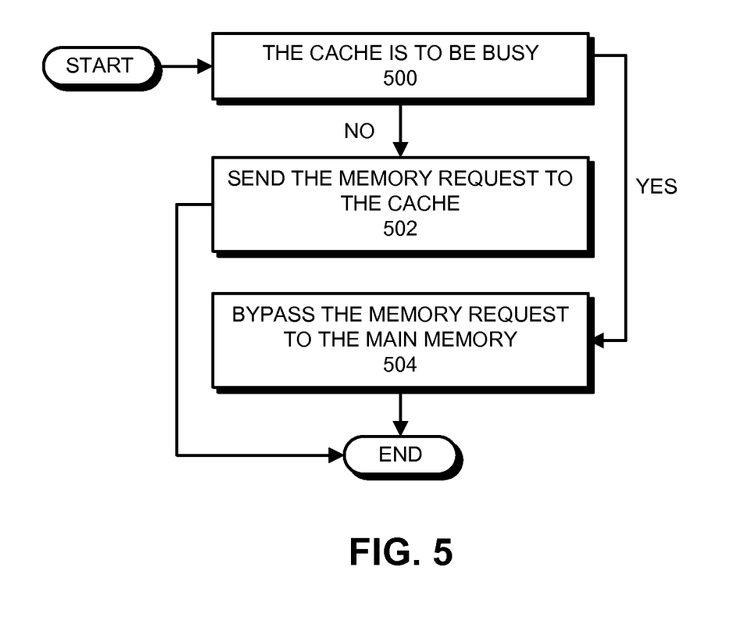
FIG. 5 presents a flowchart illustrating a process for checking a condition when conditionally bypassing memory requests in accordance with some embodiments.

FIG. 5 presents a flowchart illustrating a process for checking a condition when conditionally bypassing memory requests in accordance with some embodiments. Note that the operations shown in FIG. 5 are presented as a general example of functions performed by some embodiments. The operations performed by other embodiments include different operations and/or operations that are performed in a different order. Additionally, although certain mechanisms in computing device 100 are used in describing the process, in some embodiments, other mechanisms may perform the operations.

For the process shown in FIG. 5, it is assumed that the memory request has been received (as shown in step 400 in FIG. 4) and that control circuit 300 is checking the described condition to determine if the memory request should be bypassed to main memory 106 instead of sending the memory request to a L3 cache 104 (as shown in step 402 in FIG. 4).

The process shown in FIG. 5 starts when control circuit 300 determines whether the memory request should be bypassed to main memory 106 instead of sending the memory request to L3 cache 104 by determining whether L3 cache 104 is to be busy (step 500). In the described embodiments, L3 cache 104 is to be "busy" when L3 cache 104 will not be available for any of a number of reasons for handling the memory request within a predetermined time. Although various predetermined times may be used, in some embodiments, the predetermined time is proportional to a difference in resolution times of memory requests sent to L3 cache 104 and a resolution time of memory requests bypassed to main memory 106. Thus, in some embodiments, when it is faster (in terms of receiving returned data for the memory request at control circuit 300) to bypass a memory request to main memory 106, L3 cache 104 is considered busy.

One example of a case where L3 cache 104 is considered busy is when one or more mechanisms for communicating with the L3 cache 104 (e.g., the data 304 and/or command 306 signal lines) will not be available for use within a predetermined time. In some embodiments, control circuit 300 determines that the communication mechanisms will be busy by determining that more than a predetermined number of memory requests have been sent to L3 cache 104 and/or are to be sent to L3 cache 104 before the memory request will be able to be sent to L3 cache 104.

Another example of a case where L3 cache 104 is considered busy is when the memory request is part of a sequence of memory requests that comprises one or more other memory requests and the memory request, and a predetermined number of the other memory requests can be completed from an input-output buffer in the L3 cache 104 without refreshing the input-output buffer in the L3 cache 104. For example, if the memory request is one of a sequence of six memory requests, and all five of the other requests are directed to addresses that are close enough to each other that the other requests can be satisfied from the input-output buffer without refreshing the input-output buffer, it may be more efficient to send the other five memory requests as a group to L3 cache 104 to read from/write to the same input-output buffer before sending the memory request itself to L3 cache 104 (even where the other requests actually occur after the memory request, as described below). Generally, this occurs when the other memory requests are similar enough to each other (e.g., from the same or close addresses) to enable the input-output buffer to be used to satisfy the memory requests as a group, but the memory request to be resolved is not similar enough to the other memory requests to be satisfied from the same input-output buffer.

In some embodiments, the memory request is part of a sequence of memory requests that comprises one or more other memory requests and the memory request any time that control circuit 300 observes multiple memory requests (including the memory request), and determines that the predetermined number of the other memory requests can be completed from an input-output buffer in the L3 cache 104 without refreshing the input-output buffer. For example, when the memory request and the one or more other memory requests are stored in request buffer 302 at the same time, thereby enabling control circuit 300 to compare the buffered memory requests to one another.

The input-output buffer can be any structure in the cache from which one or more memory requests can be resolved. For example, in embodiments where L3 cache 104 is a DRAM cache, the input-output buffer is the above-described row buffer for the DRAM cache. In these embodiments, control circuit 300 may determine that the predetermined number of the other memory requests can be completed from the row buffer in L3 cache 104 without refreshing the row buffer when information for the other memory requests (e.g., addresses) indicate that the other memory requests are close enough to each other to be resolved from the same row buffer. Note that these embodiments may use the open-page policy to manage accesses to the row buffer in L3 cache 104, so that multiple reads can be made from the row buffer without refreshing the data in the row buffer.

In some embodiments, the other memory requests in the sequence of memory requests comprises memory requests that occur after the memory request to be resolved. For example, when request buffer 302 holds eight buffered memory requests in order and the memory request to be resolved is the fifth buffered memory request, control circuit 300 may determine that the first, second, third, seventh, and eighth buffered memory requests can be completed from the input-output buffer in the L3 cache 104 without refreshing the input-output buffer in the L3 cache 104—and so the first, second, third, seventh, and eighth buffered memory requests are to be sent to the L3 cache 104 before the memory request is to be sent to the L3 cache 104 to take advantage of the quicker resolution of memory requests when the input-output buffer does not have to be refreshed between memory requests.

Returning to FIG. 5, when control circuit 300 determines that L3 cache 104 not is to be busy (step 500), control circuit 300 sends the memory request to L3 cache 104 (step 502). Otherwise, control circuit 300 sends the memory request to main memory 106 (step 504).

Figure 6:
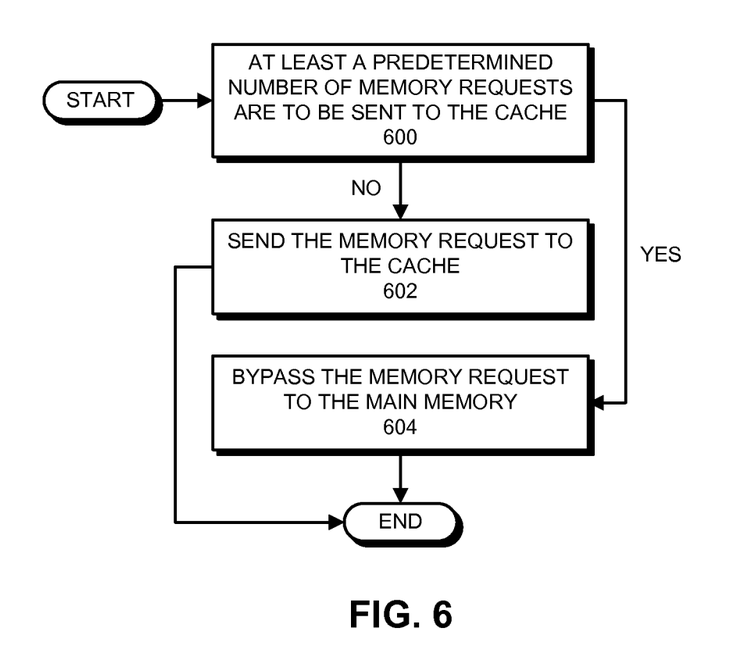
FIG. 6 presents a flowchart illustrating a process for checking a condition when conditionally bypassing memory requests in accordance with some embodiments.

FIG. 6 presents a flowchart illustrating a process for checking a condition when conditionally bypassing memory requests in accordance with some embodiments. Note that the operations shown in FIG. 6 are presented as a general example of functions performed by some embodiments. The operations performed by other embodiments include different operations and/or operations that are performed in a different order. Additionally, although certain mechanisms in computing device 100 are used in describing the process, in some embodiments, other mechanisms may perform the operations.

For the process shown in FIG. 6, it is assumed that the memory request has been received (as shown in step 400 in FIG. 4) and that control circuit 300 is checking the described condition to determine if the memory request should be bypassed to main memory 106 instead of sending the memory request to a L3 cache 104 (as shown in step 402 in FIG. 4). In addition, it is assumed that the memory request is part of a sequence of memory requests that comprises one or more other memory requests and the memory request. In some embodiments, the memory request is part of a sequence of memory requests that comprises one or more other memory requests and the memory request any time that control circuit 300 can observe multiple memory requests (including the memory request), and determine that at least a predetermined number of the other memory requests are to be sent to L3 cache 104. For example, when the memory request and the one or more other memory requests are stored in request buffer 302 at the same time, thereby enabling control circuit 300 to compare the buffered memory requests to one another.

The process shown in FIG. 6 starts when control circuit 300 determines that at least a predetermined number of the other memory requests are to be sent to L3 cache 104 (step 600). In these embodiments control circuit 300 dynamically sets (and adjusts) the predetermined number of other memory requests based on one or more factors such as a speed at which a result will be returned from a memory request received in L3 cache 104 versus in main memory 106, a relative bandwidth (or bandwidth availability) between memory controller 114 and L3 cache 104 and main memory 106, and/or other factors. For example, control circuit 300 may set the predetermined number of other memory requests based on a rate of completion of memory requests by the L3 cache 104 and a rate of completion of memory requests by main memory 106. Generally, in these embodiments, control circuit 300 may determine a proportion of the memory requests that are to be sent to L3 cache 104, and automatically send the remainder of the memory requests to main memory 106.

When control circuit 300 determines that at least the predetermined number of memory requests are to be sent (step 600), control circuit 300 sends the memory request to main memory 106 (step 604). Otherwise, control circuit 300 sends the memory request to L3 cache 104 (step 602).

Figure 7:
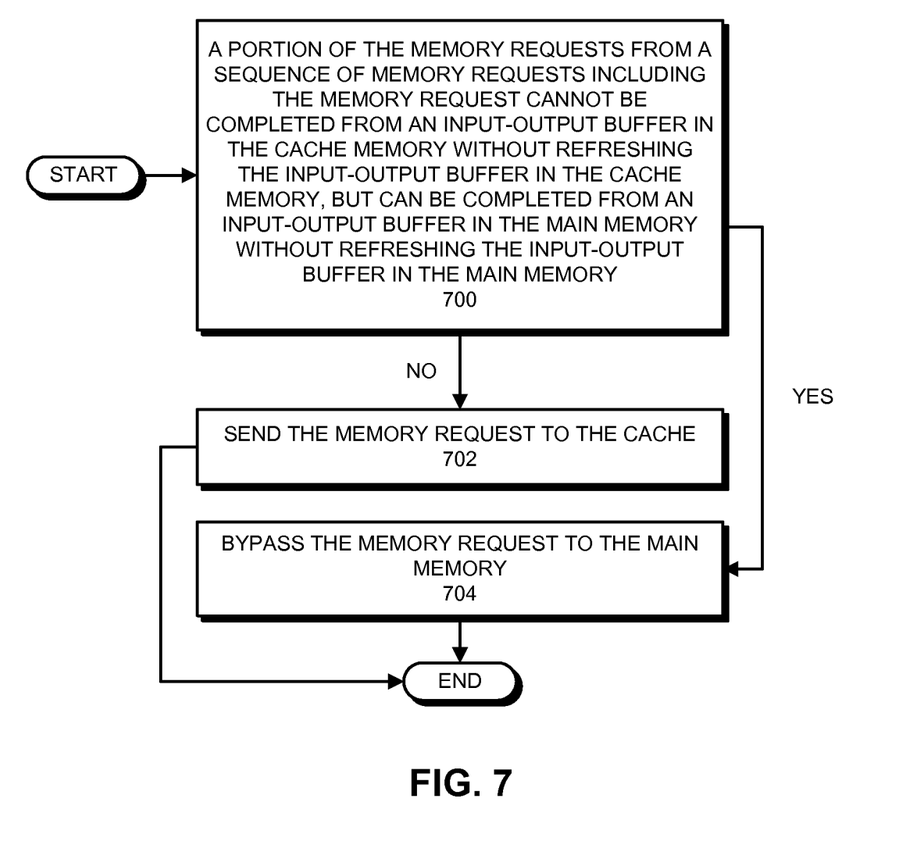
FIG. 7 presents a flowchart illustrating a process for checking a condition when conditionally bypassing memory requests in accordance with some embodiments.

FIG. 7 presents a flowchart illustrating a process for checking a condition when conditionally bypassing memory requests in accordance with some embodiments. Note that the operations shown in FIG. 7 are presented as a general example of functions performed by some embodiments. The operations performed by other embodiments include different operations and/or operations that are performed in a different order. Additionally, although certain mechanisms in computing device 100 are used in describing the process, in some embodiments, other mechanisms may perform the operations.

For the process shown in FIG. 7, it is assumed that the memory request has been received (as shown in step 400 in FIG. 4) and that control circuit 300 is checking the described condition to determine if the memory request should be bypassed to main memory 106 instead of sending the memory request to a L3 cache 104 (as shown in step 402 in FIG. 4). In addition, it is assumed that the memory request is part of a sequence of memory requests that comprises one or more other memory requests and the memory request. In some embodiments, the memory request is part of a sequence of memory requests that comprises one or more other memory requests and the memory request any time that control circuit 300 can observe multiple memory requests (including the memory request), and determine that at least a predetermined number of the other memory requests are to be sent to L3 cache 104. For example, when the memory request and the one or more other memory requests are stored in request buffer 302 at the same time, thereby enabling control circuit 300 to compare the buffered memory requests to one another.

The process shown in FIG. 7 starts when control circuit 300 determines that a portion of the memory requests from the sequence of memory requests including the memory request cannot be completed from an input-output buffer in the L3 cache 104 without refreshing the input-output buffer in the L3 cache 104, but can be completed from an input-output buffer in main memory 106 without refreshing the input-output buffer in main memory 106, and so the portion of the sequence of memory requests should be sent to main memory 106 (step 700). Generally, this occurs when the other memory requests are similar enough to each other (e.g., from the same or close addresses) to enable a larger input-output buffer in main memory 106 to be used to satisfy the memory requests as a group, but the memory requests are dissimilar enough from each other to prevent the input-output buffer in L3 cache 104 from being used to satisfy the memory requests as a group (without being refreshed at least once).

For example, when the L3 cache 104 and main memory 106 are both implemented in DRAM, the row buffer in L3 cache 104 is typically smaller than the row buffer in main memory 106. Thus, if a collection of memory requests directed to the same row buffer (in main memory 106) may be sent to main memory 106 and satisfied from the same row buffer instead of sending the memory requests to L3 cache 104, where the row buffer will need to be refreshed before the memory requests can be satisfied, these embodiments do so.

Recall that some embodiments use a closed-page policy for managing the row buffer in L3 cache 104, but use an open-page policy for managing the row buffer in main memory 106. In these embodiments (in which the row buffer is the input-output buffer for the DRAM cache and the DRAM memory), control circuit 300 determines that any two or more memory requests from the sequence of memory requests including the memory request cannot be completed from an input-output buffer in the L3 cache 104 without refreshing the input-output buffer in the L3 cache 104. However, the memory requests may be able to be completed from the input-output buffer in main memory 106 without refreshing the input-output buffer.

When control circuit 300 determines that the portion of the sequence of memory requests including the memory request should be sent to main memory 106 (step 700), control circuit 300 sends the memory request to main memory 106 (step 704). Otherwise, control circuit 300 sends the memory request to L3 cache 104 (step 702).

Figure 8:
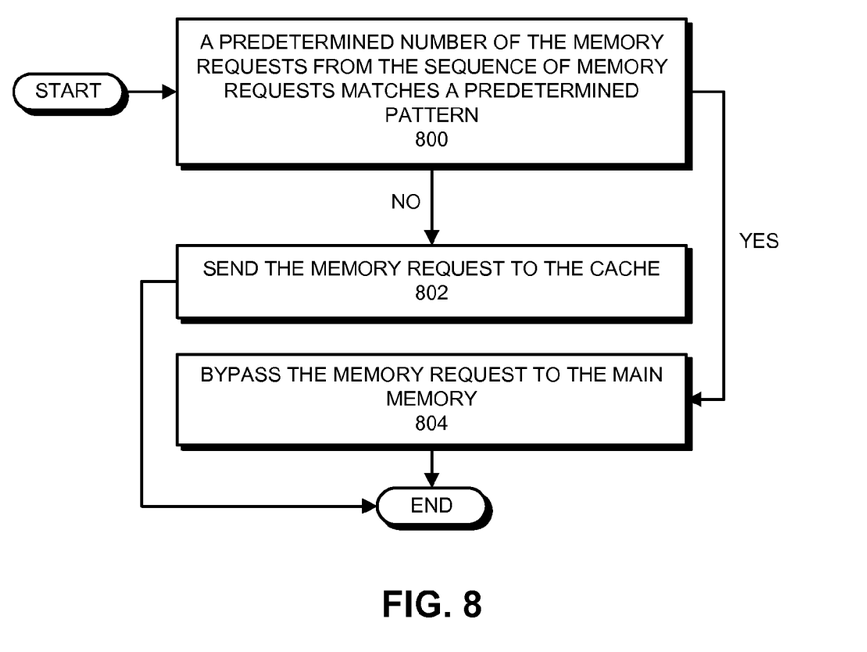
FIG. 8 presents a flowchart illustrating a process for checking a condition when conditionally bypassing memory requests in accordance with some embodiments.

FIG. 8 presents a flowchart illustrating a process for checking a condition when conditionally bypassing memory requests in accordance with some embodiments. Note that the operations shown in FIG. 8 are presented as a general example of functions performed by some embodiments. The operations performed by other embodiments include different operations and/or operations that are performed in a different order. Additionally, although certain mechanisms in computing device 100 are used in describing the process, in some embodiments, other mechanisms may perform the operations.

For the process shown in FIG. 8, it is assumed that the memory request has been received (as shown in step 400 in FIG. 4) and that control circuit 300 is checking the described condition to determine if the memory request should be bypassed to main memory 106 instead of sending the memory request to a L3 cache 104 (as shown in step 402 in FIG. 4). In addition, it is assumed that the memory request is part of a sequence of memory requests that comprises one or more other memory requests and the memory request. In some embodiments, the memory request is part of a sequence of memory requests that comprises one or more other memory requests and the memory request any time that control circuit 300 can observe multiple memory requests (including the memory request), and determine that at least a predetermined number of the other memory requests are to be sent to L3 cache 104. For example, when the memory request and the one or more other memory requests are stored in request buffer 302 at the same time, thereby enabling control circuit 300 to compare the buffered memory requests to one another.

The process shown in FIG. 8 starts when control circuit 300 determines that a predetermined number of the memory requests from the sequence of memory requests matches a predetermined pattern (step 800). Generally, the predetermined pattern includes any pattern that can be used to determine whether one or more memory requests should be bypassed to main memory 106 instead of being sent to L3 cache 104. For example, in some embodiments, the predetermined pattern is a stream of sequential memory requests, in which memory accesses (and hence corresponding memory requests) proceed through memory/memory addresses in a linear pattern. This may occur when, for example, an array is being accessed one element at a time or when instructions are being sequentially loaded. In some embodiments, for a linear pattern, a larger input-output buffer in main memory 106 can be used to satisfy multiple sequential memory requests without refreshing the input-output buffer.

When control circuit 300 determines the predetermined number of the memory requests from the sequence of memory requests matches the predetermined pattern (step 800), control circuit 300 sends the memory request to main memory 106 (step 804). Otherwise, control circuit 300 sends the memory request to L3 cache 104 (step 802).

Figure 9:
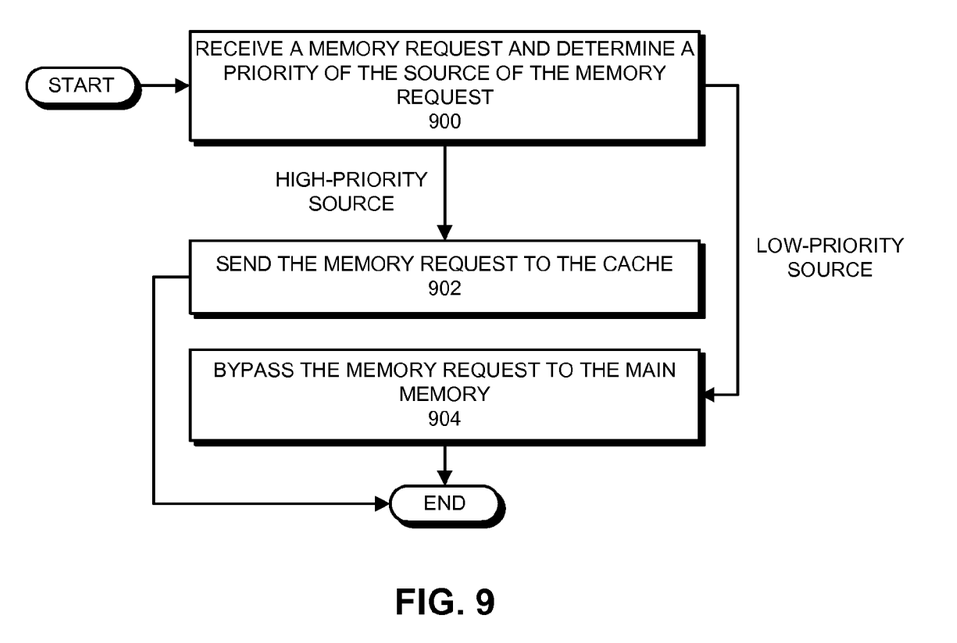
FIG. 9 presents a flowchart illustrating a process for checking a condition when conditionally bypassing memory requests in accordance with some embodiments.

FIG. 9 presents a flowchart illustrating a process for checking a condition when conditionally bypassing memory requests in accordance with some embodiments. Note that the operations shown in FIG. 9 are presented as a general example of functions performed by some embodiments. The operations performed by other embodiments include different operations and/or operations that are performed in a different order. Additionally, although certain mechanisms in computing device 100 are used in describing the process, in some embodiments, other mechanisms may perform the operations.

For the process shown in FIG. 9, it is assumed that the memory request has been received (as shown in step 400 in FIG. 4) and that control circuit 300 is checking the described condition to determine if the memory request should be bypassed to main memory 106 instead of sending the memory request to a L3 cache 104 (as shown in step 402 in FIG. 4).

The process shown in FIG. 9 starts when control circuit 300 determines a priority of the source of the memory request (step 900). In these embodiments, control circuit 300 examines information in the memory request to determine a destination to which returned data for the memory request is to be sent. Control circuit 300 then compares the information about the destination to a list of one or more high-priority (or low-priority) sources and determines if the memory request comes from a high-priority source. For example, in some embodiments, a GPU is a lower priority source of memory requests than a CPU.

When control circuit 300 determines the memory request came from a high-priority source (step 900), control circuit 300 sends the memory request to L3 cache 104 (step 902). Otherwise, control circuit 300 sends the memory request to main memory 106 (step 904).

Multiple Conditions, Additional Conditions, and Dynamic Updating of Conditions

In addition to the conditions described above, control circuit 300 may use various other conditions when determining whether to bypass memory requests to main memory 106 instead of first attempting to resolve the memory request in L3 cache 104. For example, some embodiments use conditions related to power consumption (i.e., where is the most power-efficient location to send the memory request), L3 cache 104 hit/miss rate, memory request types, load on processor 102, heating/cooling/thermal requirements for L3 cache 104 and/or main memory 106, cache/memory architecture, the performance of one of more applications executing on processor 102, and/or other conditions. As another example, some embodiments make predictions about hits/misses in L3 cache 104 based on prior hits/misses, etc.

In some embodiments, the conditions considered by control circuit 300 may be dynamically updated and/or changed. For example, the conditions considered change and/or change in value with program phases, as different applications are scheduled/suspended/migrated to/from/among cores, as the cores/package enter different C/P states, etc.

Although various individual conditions are described that may be used to determine where to send memory requests, in some embodiments, combinations of one or more of these conditions are used. Generally, any condition that can be used to determine where a memory request is to be sent can be combined with any other conditions in forming a composite condition for determining where the memory request should be sent.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for handling memory requests, comprising:
in a control circuit, performing operations for:
when a memory request should be bypassed to a main memory instead of sending the memory request to a cache memory, sending the memory request to the main memory;
otherwise, sending the memory request to the cache memory;
wherein the memory request should be bypassed to the main memory instead of sending the memory request to the cache memory when:
the memory request is part of a sequence of memory requests that comprises one or more other memory requests; and
the memory request and a predetermined number of the memory requests from the sequence of memory requests match a predetermined pattern.

2. The method of claim 1, wherein the memory request should further be bypassed to the main memory instead of sending the memory request to the cache memory when:
the cache memory is to be busy.

3. The method of claim 2, wherein the cache memory is to be busy when:
one or more mechanisms for communicating with the cache memory will not be available for use within a predetermined time.

4. The method of claim 2, wherein, when the memory request is part of a sequence of memory requests that comprises one or more other memory requests and the memory request, the cache memory is to be busy when:
a predetermined number of the other memory requests can be completed from an input-output buffer in the cache memory without refreshing the input-output buffer in the cache memory and so the predetermined number of the other memory requests are to be sent to the cache memory before the memory request.

5. The method of claim 4, wherein the predetermined number of the other memory requests that are to be sent to the cache memory before the memory request comprise at least one of:
   one or more memory requests that occurred before the memory request; or
   one or more memory requests that occurred after the memory request.

6. The method of claim 1, wherein, when the memory request is part of a sequence of memory requests that comprises one or more other memory requests and the memory request, the memory request should further be bypassed to the main memory instead of sending the memory request to the cache memory when:
   a portion of the memory requests from the sequence of memory requests including the memory request cannot be completed from an input-output buffer in the cache memory without refreshing the input-output buffer in the cache memory, but can be completed from an input-output buffer in the main memory without refreshing the input-output buffer in the main memory, and so the portion of the sequence of memory requests is to be sent to the main memory.

7. The method of claim 1, wherein, when the memory request is part of a sequence of memory requests that comprises one or more other memory requests and the memory request, the memory request should further be bypassed to the main memory instead of sending the memory request to the cache memory when:
   a predetermined number of the other memory requests are to be sent to the cache memory.

8. The method of claim 7, wherein the predetermined number is set based on a rate of completion of memory requests by the cache memory and a rate of completion of memory requests by the main memory.

9. The method of claim 1, wherein the predetermined pattern is a stream of sequential memory requests.

10. The method of claim 1, wherein the memory request should further be bypassed to the main memory instead of sending the memory request to the cache memory when:
    the memory request was generated by a lower-priority source.

11. The method of claim 1, wherein:
    the control circuit is a memory controller located on a processor semiconductor die;
    the cache memory is located on one or more DRAM cache memory semiconductor dies that are stacked with the processor semiconductor die in a first package, the DRAM cache memory dies being communicatively coupled to the processor semiconductor die and serving as a cache for a processor on the processor semiconductor die; and
    the main memory is located on one or more DRAM memory semiconductor dies in a second package that is coupled to the first package.

12. An apparatus for handling memory requests, comprising:
    a control circuit, wherein the control circuit is configured to:
       when a memory request should be bypassed to a main memory instead of sending the memory request to a cache memory, send the memory request to the main memory;
       otherwise, send the memory request to the cache memory;
    wherein the memory request should be bypassed to the main memory instead of sending the memory request to the cache memory when:
       the memory request is part of a sequence of memory requests that comprises one or more other memory requests; and
       the memory request and a predetermined number of the memory requests from the sequence of memory requests match a predetermined pattern.

13. The apparatus of claim 12, wherein the control circuit is configured so that the memory request should also be bypassed to the main memory instead of sending the memory request to the cache memory when:
    the cache memory is to be busy.

14. The apparatus of claim 13, wherein the cache memory is to be busy when:
    one or more mechanisms for communicating with the cache memory will not be available for use within a predetermined time.

15. The apparatus of claim 13, wherein, when the memory request is part of a sequence of memory requests that comprises one or more other memory requests and the memory request, the cache memory is to be busy when:
    a predetermined number of the other memory requests can be completed from an input-output buffer in the cache memory without refreshing the input-output buffer in the cache memory and so the predetermined number of the other memory requests are to be sent to the cache memory before the memory request.

16. The apparatus of claim 15, wherein the predetermined number of the other memory requests that are to be sent to the cache memory before the memory request comprise at least one of:
    one or more memory requests that occurred before the memory request; or
    one or more memory requests that occurred after the memory request.

17. The apparatus of claim 12, wherein, when the memory request is part of a sequence of memory requests that comprises one or more other memory requests and the memory request, the control circuit is configured so that memory request should also be bypassed to the main memory instead of sending the memory request to the cache memory when:
    a portion of the memory requests from the sequence of memory requests including the memory request cannot be completed from an input-output buffer in the cache memory without refreshing the input-output buffer in the cache memory, but can be completed from an input-output buffer in the main memory without refreshing the input-output buffer in the main memory, and so the portion of the sequence of memory requests is to be sent to the main memory.

18. The apparatus of claim 12, wherein the predetermined pattern is a stream of sequential memory requests.

19. The apparatus of claim 12, wherein the control circuit is configured so that the memory request should also be bypassed to the main memory instead of sending the memory request to the cache memory when:
    the memory request was generated by a lower-priority source.

20. The apparatus of claim 12, further comprising:
    a processor semiconductor die comprising a memory controller in a processor, wherein the control circuit is located in the memory controller;
    one or more DRAM cache memory semiconductor dies stacked with the processor semiconductor die, the DRAM cache memory dies being communicatively coupled to the processor semiconductor die and serving as a cache for a processor on the processor semiconductor die;

one or more DRAM memory semiconductor dies;

a first package containing the processor semiconductor die and the DRAM cache memory dies stacked with the processor semiconductor die; and a second package that is communicatively coupled to the first package, the second package containing the DRAM memory semiconductor dies.

21. A computer-readable storage medium storing instructions that, when executed by a computing device, cause the computing device to perform a method for handling memory requests, wherein the method comprises:

when a memory request should be bypassed to a main memory instead of sending the memory request to a cache memory, sending the memory request to the main memory;

otherwise, sending the memory request to the cache memory;

wherein the memory request should be bypassed to the main memory instead of sending the memory request to the cache memory when:

the memory request is part of a sequence of memory requests that comprises one or more other memory requests; and the memory request and a predetermined number of the memory requests from the sequence of memory requests match a predetermined pattern.

* * * * *